United States Patent [19]
Yee et al.

[11] Patent Number: 6,037,748
[45] Date of Patent: Mar. 14, 2000

[54] METHOD AND APPARATUS FOR CONTROL OF AN ELECTRONIC SYSTEM USING INTELLIGENT MOVEMENT DETECTION

[75] Inventors: David Moon Yee, Scottsdale; Robert Henry Bickley, Paradise Valley; Philip John Zucarelli, Glendale; Theodore Woolley Keller, Scottsdale, all of Ariz.

[73] Assignee: Motorola, Inc., Schaumburg, Ill.

[21] Appl. No.: 09/098,005

[22] Filed: Jun. 15, 1998

[51] Int. Cl.[7] .................................................. H02J 7/00
[52] U.S. Cl. ........................................... 320/127; 307/10.7
[58] Field of Search ........................... 320/127; 340/636, 340/571, 572, 568, 669; 307/10.1, 10.7

[56] References Cited

U.S. PATENT DOCUMENTS

| | | | |
|---|---|---|---|
| 4,337,462 | 6/1982 | Lemelson | 340/572 |
| 4,727,270 | 2/1988 | Payne | 307/540 |
| 5,204,991 | 4/1993 | Law | 307/10.7 |
| 5,212,451 | 5/1993 | Werner, Jr. | 340/458 |
| 5,317,304 | 5/1994 | Choi | 340/571 |
| 5,406,256 | 4/1995 | Ledel et al. | 340/539 |
| 5,531,091 | 7/1996 | Gademann et al. | 73/514.29 |
| 5,574,429 | 11/1996 | Streeter | 340/571 |
| 5,596,144 | 1/1997 | Swanson | 73/514.18 |
| 5,748,083 | 5/1998 | Reitkerk | 340/568 |
| 5,767,771 | 6/1998 | Lamont | 340/571 |
| 5,903,217 | 5/1999 | Stanczak et al. | 340/554 |

*Primary Examiner*—Edward H. Tso
*Attorney, Agent, or Firm*—Bradley J. Botsch; Frank J. Bogacz; Jeff D. Limon

[57] ABSTRACT

A battery powered electronic system (50, FIG. 1) is controlled by a movement sensor (20) which senses the acceleration of the electronic system (50). The output of the movement sensor (20) is filtered by an event duration filter (FIG. 2, 120, 121) which determines if the output is of sufficient duration and acceleration to trigger a change in the operation of the electronic system (50). If the acceleration meets the triggering criteria, the electronic system (50) can be made to change an on/off state, an operating mode, or to effect an incremental change in the electronic system (50) such as adjusting the volume or channel setting. Additional movement sensors (20) oriented in different axes can be used to trigger a change in the operation of the electronic system (50) according to a plurality of different directions of acceleration.

21 Claims, 3 Drawing Sheets

6,037,748

METHOD AND APPARATUS FOR CONTROL OF AN ELECTRONIC SYSTEM USING INTELLIGENT MOVEMENT DETECTION

FIELD OF THE INVENTION

The invention relates to electronic systems and, more particularly, to techniques for control of electronic systems through movement detection.

BACKGROUND OF THE INVENTION

In a battery powered electronic system, emphasis is placed on selecting components and implementing techniques which conserve battery power. These techniques enable an electronic system to perform its intended functions while efficiently utilizing battery power. Since chemical storage batteries can comprise a significant portion of the weight of an electronic system, the minimization of required battery power can translate into reduced weight of the electronic system. This is appealing to both commercial and military users of battery powered electronic systems.

In a commercial environment, reducing battery weight is advantageous since consumers generally prefer light weight portable electronics as opposed to their heavier counterparts. Additionally, it is advantageous to employ power saving techniques in order to extend the interval between replacement or recharge of a battery power source.

In a military environment, extending battery life has become more and more important due to the increased number of portable electronic systems in use today. As armed forces employ a greater number of portable electronic systems in the field, the need to extend the battery life of those systems increases in importance. Additionally, as military users begin to depend on portable electronic systems, such as radio transceivers, GPS navigation devices, rescue beacons, and portable sighting systems, any loss of service of these types of devices can have dangerous consequences. Further, the constant need for batteries by fielded military units creates a constant strain on a military supply system as batteries are continuously sent to these units.

For both commercial and military users of electronic systems, it is advantageous to automatically deactivate an electronic system when the system is not in use. This ensures that power is not wasted while the user is not deriving a benefit from the system. However, as is especially true for military users, turning an electronic system to the "off" state is not always the highest priority of the user, especially in a hostile environment. Additionally, as systems continue to be placed in smaller and smaller packages while providing greater and greater functionality, the controls used to regulate the operation of the system become correspondingly small. Thus, it is desirable to control electronic system through means such as through acceleration of the system (as used in automotive air bag deployment) or other technique.

Therefore, what is needed, are a method and apparatus for ensuring that electronic systems are automatically powered off, or at least consuming less power while not in use.

What is also needed, are a method and apparatus for more conveniently controlling the operation of a portable electronic system.

BRIEF DESCRIPTION OF THE DRAWINGS

A brief description of the drawings is provided wherein like reference numbers used throughout the FIGS. correspond to like components.

DESCRIPTION OF THE PREFERRED EMBODIMENT

A method and apparatus for control of an electronic system using intelligent movement detection enables an electronic system to be automatically deactivated based on movement of the system. Therefore, when the electronic system is not in use, it can be deactivated thus conserving battery resources. For both commercial and military users, ensuring that an electronic system is deactivated when it is not in use increases the battery life for a given electronic system. For military users especially, deactivation of an electronic system when it is not in use increases the likelihood that a given electronic system will have sufficient power to perform an intended function when its operation is crucial. Additionally, the method and apparatus can be used to control more functions of an electronic system other than merely its on/off state. This can enable a user to easily control an electronic system through methods other than conventional means of control such as a volume switch or frequency control dial.

Figure 1:
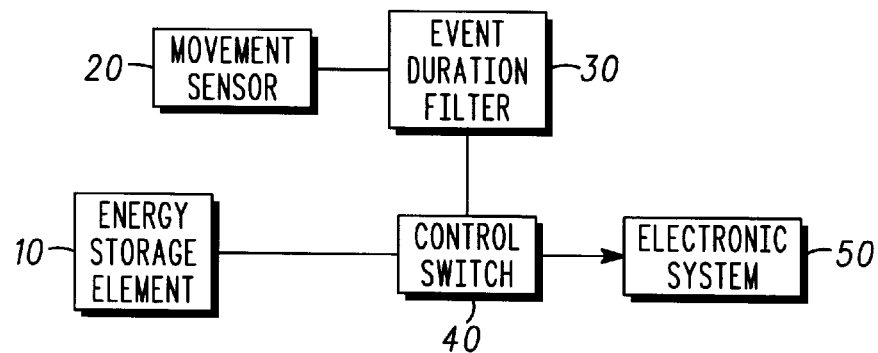
FIG. 1 illustrates a block diagram of an apparatus for control of an electronic system using intelligent movement detection in accordance with a preferred embodiment of the invention.

FIG. 1 illustrates a block diagram of an apparatus for control of an electronic system using intelligent movement detection in accordance with a preferred embodiment of the invention. In FIG. 1, energy storage element 10 provides primary electric power to electronic system 50 through control switch 40. Energy storage element 10 can be comprised of one or a plurality of batteries or other chemical storage element. Generally, energy storage element 10 represents an exhaustible form of energy requiring frequent or occasional replacement or recharge.

Electronic system 50 can be any commercial or military electronic system. In a commercial environment, electronic system 50 may be a hand-held entertainment device, such as a toy video game, or a portable radio, for example. In a military environment, electronic system 50 may comprise a helmet mounted sighting system, or any type of radio transceiver, for example. Those skilled in the art can envision the numerous devices which can be embodied by electronic system 50.

In FIG. 1, movement sensor 20 senses the movement of itself or some portion of electronic system 50. As known to those skilled in the art, movement sensor 20 may sense movement through acceleration or other change in vector velocity. Movement sensor 20 can comprise a microcapacitance change device, an electrostatic charge change device, a resistance change device, or a micro tuning fork. In a preferred embodiment, movement sensor 20 possesses sufficient sensitivity in order to respond to accelerations typical for the given application environment. For example, movement sensor 20 may be employed in a pilot's rescue beacon in a military environment. In this case, movement sensor 20 can be designed to respond only to relatively high "G" forces such as those present when a pilot ejects from an aircraft. In a commercial application, movement sensor 20 may respond to small changes in acceleration such as a tap on the side of the enclosure which houses a portable consumer electronic device.

In an alternative embodiment, movement sensor 20 may sense a change in the orientation of itself or of electronic system 50. In this embodiment, movement sensor 20 senses acceleration in a direction substantially parallel to a gravitational field. Thus, when movement sensor 20 is oriented vertically, a signal is conveyed to control switch 40. This signal can correspond to the 1 G acceleration normally exerted by the earth's gravitational field. Therefore, when movement sensor 20 is oriented horizontally, no signal is conveyed since there is no acceleration in this orientation.

In a preferred embodiment, movement sensor 20 is coupled to event duration filter 30. Event duration filter 30 determines if any movement event sensed by movement sensor 20 is of sufficient duration to warrant a change of state of control switch 40. Thus, in a military application for a portable transmitter which activates after a pilot ejects from an aircraft, event duration filter 30 would ensure that the portable transmitter does not activate unless an actual ejection has occurred. In this embodiment, moderate and short-lived accelerations such as those experienced during normal activities such as walking to and from an aircraft as well as normal aircraft maneuvers would not trigger event duration filter 30 since these accelerations are neither sufficiently long enough in duration nor of sufficient magnitude.

In an alternative embodiment, control switch 40, as shown in FIG. 1, places electronic system 50 in a standby mode. Thus, control switch 40 may prepare electronic system 50 to respond to an external stimulus such as a radio signal or an acoustic signal. In this manner, the action of control switch 40 can prepare electronic system 50 to respond to a further command through a radio or acoustic receiver.

In yet another alternative embodiment, control switch 40 effects incremental changes in the operational mode of electronic system 50. These incremental changes can include changes in audio volume, or a frequency or channel setting in a communications device.

Those skilled in the art can envision numerous other state changes, mode changes, and incremental changes in the operation of any electronic system which can be controlled by way of control switch 40.

Figure 2:
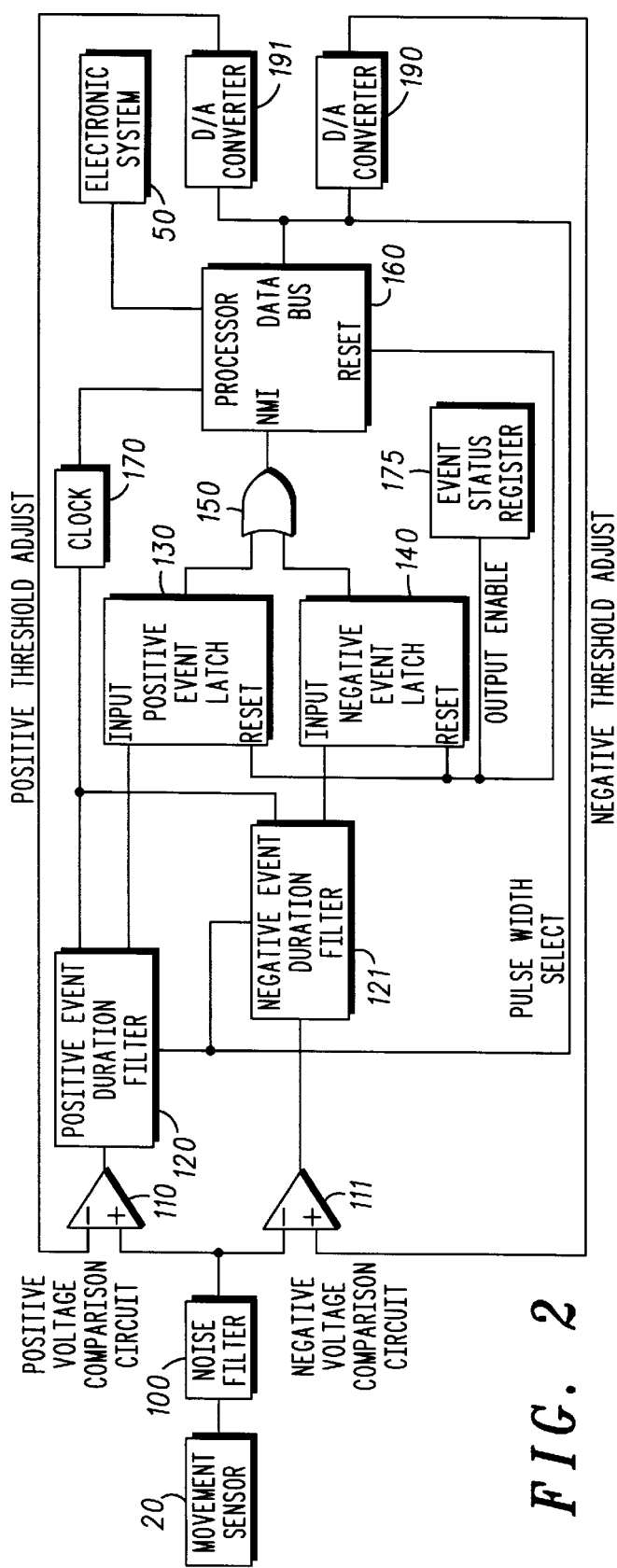
FIG. 2 illustrates an apparatus for control of an electronic system using intelligent movement detection at a detailed level in accordance with a preferred embodiment of the invention.

FIG. 2 illustrates an apparatus for control of an electronic system using intelligent movement detection at a detailed level in accordance with a preferred embodiment of the invention. In FIG. 2, movement sensor 20 is coupled to noise filter 100. Noise filter 100 serves to reduce any stray signals from movement sensor 20 which do not result from an actual acceleration of the sensor. Noise filter 100 can be an electromagnetic interference filter for use in those electronic systems which may be susceptible to either conducted or radiated forms of electromagnetic interference.

The output of noise filter 100 is coupled to voltage comparison circuits 110 and 111. Positive voltage comparison circuit 110 is arranged to detect positive acceleration events, while negative voltage comparison circuit 111 is arranged to detect negative acceleration events. For the case of positive event detection, the output of positive event voltage comparison circuit 110 will change state when the output of movement sensor 20 becomes greater than the positive threshold adjust voltage from digital to analog converter 191. For the case of negative event detection, the output of negative event voltage comparison circuit 111 will change state when the output of movement sensor 20 is less than the negative threshold adjust voltage from digital to analog converter 190.

In a preferred embodiment, event threshold voltages from digital to analog converters 190 and 191 are adjustable by processor 160. Processor 160, adjusts digital to analog converters 190 and 191 through the databus output shown in FIG. 2 in order to allow for the dynamic control of the magnitude of the acceleration events to which the system should respond.

In a preferred embodiment, processor 160 includes a timing element which inactivates electronic system 50 in the event that the system has been immobile for a predetermined period of time. This obviates the need to manually inactivate electronic system 50 when the system is being stored for later use. This can be particularly attractive in a military application such as a battery powered helmet mounted sighting system which is inactivated when a soldier removes his helmet and places it on the ground. In this event, the sighting system can be deactivated after a short period of time, thus conserving the system's battery. Further, in an environment where a soldier is wearing bulky gloves for protection against nuclear, chemical, or biological contaminants, the soldier does not have to find and manipulate a small on/off switch in order to inactivate the system.

The output of voltage comparison circuits 110 and 111 are conveyed to positive and negative event duration filters 120 and 121. The details of the implementation of positive and negative event duration filters 120 and 121 are described herein with reference to FIG. 3. Positive and negative event duration filters 120 and 121 function as digitally programmable pulse width discriminators which perform a substantially similar function as event duration filter 30 of FIG. 1. In a preferred embodiment, clock 170 operates at a low frequency, such as 32 kilohertz, in order to minimize power dissipation. Clock 170 conveys a signal to positive and negative event duration filters 120 and 121. By way of example, and not by limitation, positive and negative event duration filters 120 and 121 possess eight bit programmability which provides 256 discrete steps. Thus, each filter can be set to respond to an event waveform from 31.25 microseconds to eight milliseconds. Thus, once a positive acceleration event of a duration sufficient to pass through positive event duration filter 120 takes place, such as a movement of movement sensor 20, the event is captured by positive event latch 130. In the event that movement sensor 20 experiences a negative acceleration event of a sufficient duration, the event will pass through negative event duration filter 121 and be captured by negative event latch 140.

In a preferred embodiment, positive and negative event latches 130 and 140 are simple logic devices that maintain a logic "high" when triggered by a short-lived logic "high" input. Positive and negative event latches 130 and 140 are reset via a "reset" input. The outputs of positive and negative event latches 130 and 140 are then combined with logic "OR" gate 150 and then fed to the non-maskable interrupt (NMI) input of processor 160. In the preferred embodiment, a Motorola MC68HC05 or MC68HC11 series processor is used. Processor 160, then executes an interrupt handler program which, among other functions, activates processor 160 from a low power or sleep mode. Event status register 175 can then be accessed through the appropriate output of processor 160 in order to determine the cause of the interrupt, such as positive or negative acceleration. Based on the cause of the interrupt, processor 160 can then make the appropriate change in the state, mode, or incremental change of electronic system 50. An interrupt acknowledge signal can then be asserted by processor 160 during the execution of the interrupt handler software in order to reset positive and negative event latches 130 and 140. This resetting prepares the apparatus of FIG. 2 for another acceleration event.

The apparatus of FIG. 2 allows for adjustment in both the magnitude and the duration of the event signal from movement sensor 20. As previously mentioned, the adjustment of the positive or negative event threshold voltages from digital to analog converters 190 and 191 provides the capability to adjust the acceleration at which positive event latch 130 or negative event latch 140 will trigger. Additionally, the capability to program positive and negative event duration filters 120 and 121 to trigger from 31.25 microseconds to up to 8 milliseconds provides excellent flexibility. Thus, capability to adapt the apparatus of FIG. 2 to accommodate variable accelerations and durations allows the circuitry to respond to a number of different acceleration profiles. This enables a wide range of control functions to be realized resulting from the movements which electronic system 50 is subjected.

Figure 3:
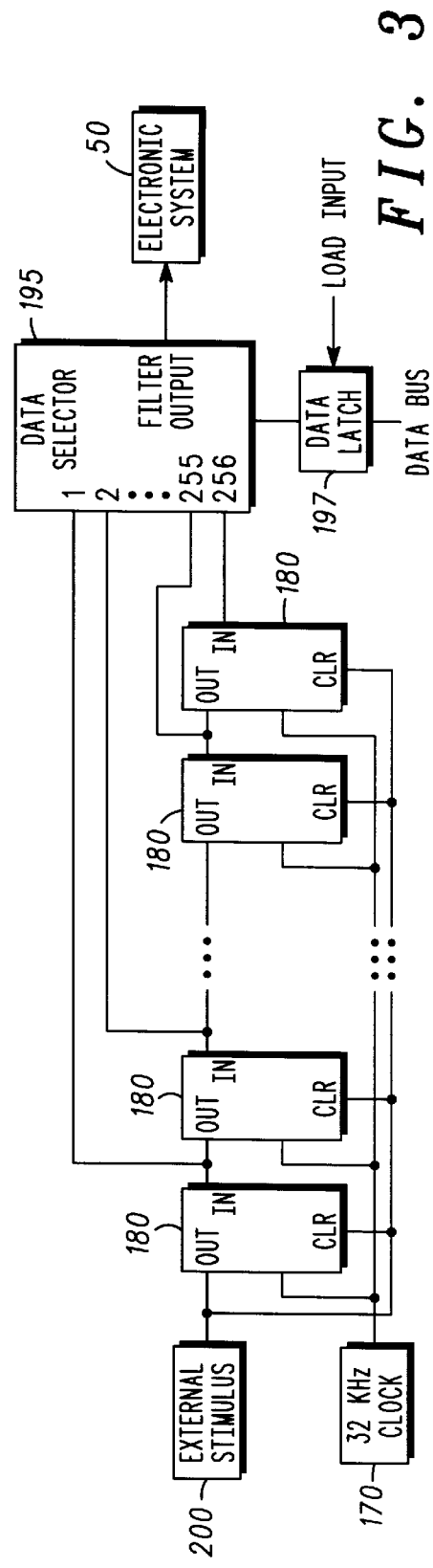
FIG. 3 illustrates an event duration filter for use in an apparatus for control of an electronic system using intelligent movement detection in accordance with a preferred embodiment of the invention.

FIG. 3 illustrates an event duration filter for use in an apparatus for control of an electronic system using intelligent movement detection in accordance with a preferred embodiment of the invention. In FIG. 3, a detailed implementation of positive and negative event duration filters 120 and 121 is provided. In FIG. 3, a logic "high" waveform is input from external stimulus 200 to a 256 stage shift register comprised of "D" type flip-flop elements 180. External stimulus 200 can be adjustable in magnitude through implementing a positive or negative threshold adjust and voltage comparison circuits 110 and 111 of FIG. 2.

The waveform from external stimulus 200 is propagated through flip-flop elements 180 of the shift register on the rising edge of 32 kilohertz clock 170. Each stage of the shift register is fed to a one-of-256 data selector element 195. Based on the selected input from data latch 197, one of the 256 taps of the shift register is routed to the output of the event duration filter.

In a preferred embodiment, the input waveform is delayed by 31.25 microseconds through each successive flip-flop element 180. In addition, since the input waveform is also connected to the reset input of each shift register flip-flop, the waveform will cease to propagate through the shift register when it becomes a logic "low". In this manner, each input waveform from external stimulus 200 must last longer than the multiple of the period selected by the binary value of the select input from data latch 197, multiplied by 31.25 microseconds in order for the waveform to be present at the filter output of data selector 195. For example, if the binary value of the selected input from data latch 197 is 39, then the duration of the signal from external stimulus 200 must exceed 1.219 milliseconds (31.25 microseconds×39=1.219 milliseconds) in order for the waveform to be present at the filter output of data selector 195.

Loading of data latch 197 is controlled by a data strobe from processor 160. Data latch 197 functions as a short-term storage area that retains the last value written to it by processor 160 through its databus output.

Figure 4:
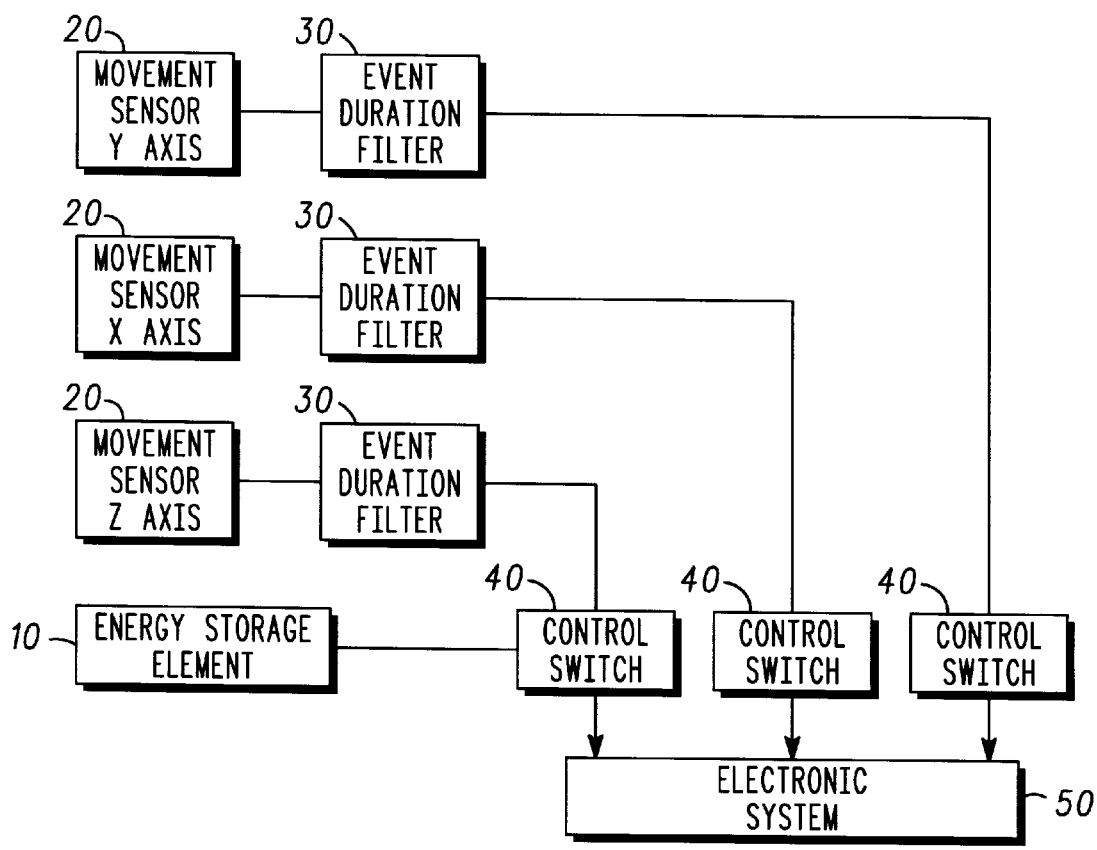
FIG. 4 illustrates an apparatus for three axis control of an electronic system using intelligent movement detection in accordance with a preferred embodiment of the invention.

FIG. 4 illustrates an apparatus for three-axis control of an electronic system using intelligent movement detection in accordance with a preferred embodiment of the invention. In FIG. 4, three circuits (20) such as those discussed with reference to FIG. 2 are implemented in an x, y, and z-axis. Through the use of three-axis movement detection, a portable electronic system can be controlled through an acceleration in a variety of orthogonal directions. For example, the volume output of a portable radio could be controlled through acceleration in an x-axis. Thus, a nudge of the unit in the direction of the +x-axis can allow the volume level to be increased. Additionally, a nudge in the −x direction can allow the volume level to be decreased. Similarly, a frequency control or channel setting can be controlled through movement in the +y-axis (to increase frequency) and through movement in the −y-axis (to decrease frequency). Further, the on/off state of the portable radio can be controlled through acceleration in the z-axis.

Figure 5:
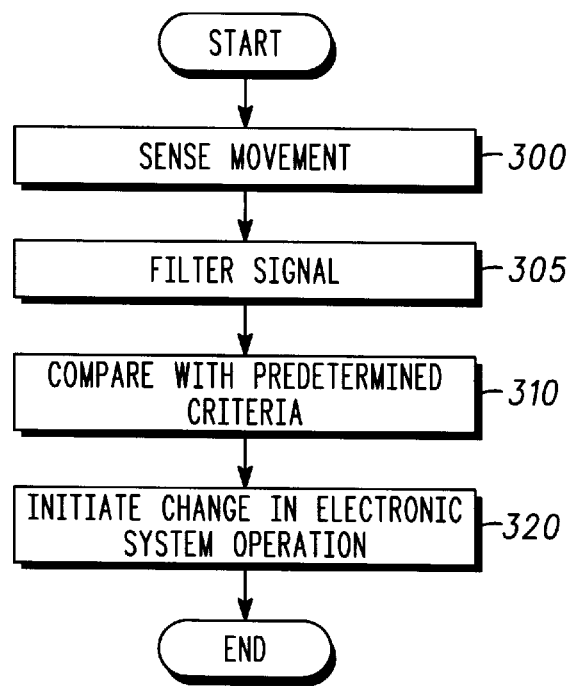
FIG. 5 illustrates a method for control of an electronic system using intelligent movement detection in accordance with a preferred embodiment of the invention.

FIG. 5 illustrates a method for control of an electronic system using intelligent movement detection in accordance with a preferred embodiment of the invention. Step 300 comprises sensing movement of the electronic system. In step 305 the signal is filtered by an electronic filter. In step 310 the movement is compared with a predetermined criteria such as an acceleration profile or duration in either a horizontal or vertical axis. In step 320, a change in the operation of the electronic system is initiated. The change in the operation of the system in step 320 can be a change in the on/off state of the system, placing the system into a standby mode, or can be an incremental change such as a change in an audio output level (volume) or frequency/channel setting.

Figure 6:
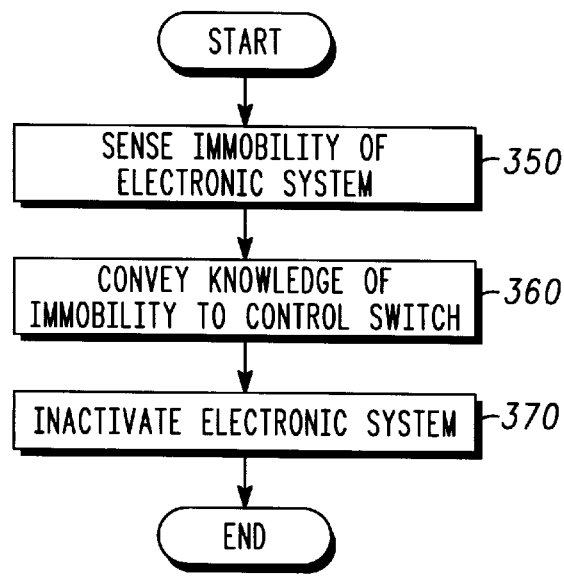
FIG. 6 illustrates a method for reducing power consumption in an electronic system in accordance with a preferred embodiment of the invention.

FIG. 6 illustrates a method for reducing power consumption in an electronic system in accordance with a preferred embodiment of the invention. In step 350, a movement sensor, such as an accelerometer, is used to determine that the system has been immobile for a predetermined time duration. In step 360, the knowledge of this immobility is conveyed to a control switch. Step 370 comprises switching the control switch to inactivate the electronic system.

A method and apparatus for control of an electronic system using intelligent movement detection provides the capability to effect a change in the operation of the system through its movement. The change in the operation of the electronic system can be its on/off operating state, switching the electronic system to a standby mode, or effecting an incremental change in the operation of the system such as increasing the audio output or changing a channel setting. In the absence of movement for a predetermined period of time, the electronic system can be inactivated thus conserving the battery resources which provide primary power to the system.

The foregoing description of the specific embodiments will so fully reveal the general nature of the invention that others can, by applying current knowledge, readily modify and/or adapt for various applications such specific embodiment without departing from the generic concept, and therefore such adaptations and modifications should and are intended to be comprehended within the meaning and range of equivalents of the disclosed embodiments.

It is to be understood that the phraseology or terminology employed herein is for the purpose of description and not limitation. Accordingly, the invention is intended to embrace all such alternatives, modifications, equivalents and variations as fall within the true spirit and broad scope of the appended claims.

What is claimed is:

1. An apparatus for power control of an electronic system using movement detection, the apparatus comprising:
   a movement sensor which senses when the electronic system is moved;
   an event duration filter coupled to an output of the movement sensor which determines if a motion is in accordance with a predetermined criteria, said event duration filter including at least one shift register; and
   a switch coupled to the event duration filter which controls a mode of the electronic system.

2. The apparatus of claim 1, wherein the movement sensor comprises an accelerometer.

3. The apparatus of claim 1, wherein the switch controls an on/off state of a portion of the electronic system.

4. The apparatus claimed in claim 1, wherein the movement sensor comprises a micro tuning fork.

5. The apparatus claimed in claim 1, wherein the movement sensor comprises a microcapacitance change device.

6. The apparatus claimed in claim 1, wherein the movement sensor comprises an electrostatic charge change device.

7. The apparatus claimed in claim 1, wherein the movement sensor comprises a resistance change device.

8. The apparatus of claim 1, wherein the event duration filter comprises a data selector.

9. The apparatus of claim 1, wherein the event duration filter comprises a data latch.

10. The apparatus of claim 1, wherein the switch controls an incremental change in an operation of the electronic system.

11. The apparatus of claim 10, wherein the incremental change comprises modifying an audio output level of the electronic system.

12. The apparatus of claim 10, wherein the incremental change comprises modifying the frequency to which the electronic system is tuned.

13. The apparatus of claim 1, wherein the switch causes the electronic system to transmit information.

14. The apparatus of claim 1, wherein the switch enables the electronic system to respond to an external stimulus.

15. The apparatus of claim 14, wherein the external stimulus comprises reception of a command by way of a radio signal.

16. The apparatus of claim 14, wherein the external stimulus comprises reception of a command by way of an acoustic signal.

17. An apparatus for sensing movement in orthogonal axes in an electronic system, comprising:
   a plurality of movement sensors which sense movement in a particular direction;
   a plurality of event duration filters which determine if a motion is in accordance with a predetermined criteria, wherein each event duration filter is coupled to an output of each of the plurality of movement sensors; and
   a switch which changes an operation of the electronic system, wherein the switch is coupled to an output of each of the plurality of event duration filters.

18. An event duration filter which indicates when a signal of sufficient magnitude and duration is present at an input, the event duration filter comprising:
   a plurality of flip-flops arranged as a series shift register, the series shift register comprising a first flip-flop, a plurality of middle flip-flops, and a last flip-flop, an output of the first flip-flop and the plurality of middle flip-flops being coupled to at least one input of a following flip-flop;
   the first flip-flop having a first and second input coupled to an external device, wherein the external device produces an electrical signal responsive to a stimulus, the first flip-flop also having a third input coupled to an external clock, the first flip-flop having an output coupled to an input of a first of the plurality of middle flip-flops and to a data selector, the data selector also being coupled to a data latch;
   the plurality of middle flip-flops having a first input coupled to a previous flip-flop, and an output coupled to a following flip-flop and an input of the data latch, the plurality of middle flip-flops also being coupled to the external device and the external clock; and
   the last flip-flop having an input coupled to a previous flip-flop, and an output to the data selector, the last flip-flop also having an input to the external device and the external clock.

19. The event duration filter of claim 18, wherein the event duration filter is installed in a radio receiver.

20. The event duration filter of claim 18, wherein the event duration filter is installed in a toy comprising electronic circuitry.

21. The event duration filter of claim 18, wherein the event duration filter additionally comprises a threshold adjustment which adjusts the magnitude of the external stimulus.

* * * * *